(12) United States Patent
Davies et al.

(10) Patent No.: US 6,259,457 B1
(45) Date of Patent: Jul. 10, 2001

(54) SYSTEM AND METHOD FOR GENERATING GRAPHICS MONTAGE IMAGES

(75) Inventors: Ken Davies; Jackie Young, both of Toronto (CA)

(73) Assignee: Random Eye Technologies Inc., Toronto (CA)

( * ) Notice: Subject to any disclaimer, the term of this patent is extended or adjusted under 35 U.S.C. 154(b) by 0 days.

(21) Appl. No.: 09/020,238

(22) Filed: Feb. 6, 1998

(51) Int. Cl.$^7$ .................................................. G06T 11/80
(52) U.S. Cl. ............................................ 345/435; 345/431
(58) Field of Search ................................... 345/435, 440, 345/431; 364/518

(56) References Cited

U.S. PATENT DOCUMENTS

| | | |
|---|---|---|
| 4,694,407 * | 9/1987 | Ogden ................................. 364/518 |
| 4,954,970 | 9/1990 | Walker et al. . |
| 4,982,343 | 1/1991 | Hourvitz et al. . |
| 5,381,526 | 1/1995 | Ellson . |
| 5,414,811 | 5/1995 | Parulski et al. . |
| 5,553,211 | 9/1996 | Uotani . |
| 5,638,499 | 6/1997 | O'Connor et al. . |
| 5,808,624 | 9/1998 | Ikedo . |

FOREIGN PATENT DOCUMENTS

0620529A1   10/1994   (EP) .

OTHER PUBLICATIONS

*KPT Convolver Explorer's Guide*, HSC Software Corp.
Dani et al., *Automated Assembling of Images: Image Montage Preparation*, 1995, pp. 431–445.
Sakamoto et al., *Flexible Montage Retrieval for Image Data*, 1994, pp. 25–33.
Patent Abstracts of Japan, *Montage Generating Device*, publication No. 08044893, 1996.

\* cited by examiner

*Primary Examiner*—Mark Zimmerman
*Assistant Examiner*—Kimbinh T. Nguyen
(74) *Attorney, Agent, or Firm*—Bereskin & Parr

(57) ABSTRACT

A system for generating graphics montage images comprises an image database, a display generator having an image selector and an image arranger. The system also includes a user interface and a display for displaying the generated montage images. The image database stores image data records correlated to images. The image selector selects a plurality of images from the database and the image arranger determines the display characteristics for each selected image. The selected images are then displayed together, as modified by their display characteristics, forming the graphics montage image. Typically, a plurality of graphics montage images are generated and displayed to the user. The invention also involves a method for assisting in the generation of graphic montage images, having the following steps: (a) selecting a plurality of selected images from an image database; (b) determining modifying characteristics for each of the selected images; and (c) displaying the selected images as modified by the modifying characteristics, thereby displaying a graphics montage image.

13 Claims, 12 Drawing Sheets

SYSTEM AND METHOD FOR GENERATING GRAPHICS MONTAGE IMAGES

FIELD OF THE INVENTION

This invention relates to the field of graphical art, and in particular, to graphics montages, photograph, photo compositions, design and art direction.

BACKGROUND OF THE INVENTION

The recent proliferation of software for the manipulation and enhancement of digitized images has provided an invaluable and relatively inexpensive tool for graphics montage artists to generate impressive graphics montage designs. Frequently, such montages create an overall artistic effect through the merging, overlapping and careful placement of multiple images. Libraries of computerized images are also valuable resources from which graphics montage artists and designers may obtain high quality images for use in their montage designs.

Unfortunately, however, the process of creating unique and artistic montages can be a daunting task, requiring skill, creativity and, most often, a substantial amount of time. Suitable images need to be selected and then arranged in a complementary fashion to achieve the desired result. For both beginner and seasoned graphics montage designers alike, the process can be an immensely frustrating and time consuming one, as a designer may try numerous combinations and permutations of images before a satisfactory montage is achieved.

There is accordingly a need for systems and methods which make it easier and more efficient for graphics montage artists to generate graphics montage designs.

SUMMARY OF THE INVENTION

The present invention is directed towards a system for assisting in and actually generating graphics montage images.

In one aspect, the system of the present invention has an image database which stores a plurality of image data files containing data correlated to images. The system also has a display generator coupled to the image database, which is responsive to operational instructions for generating montage images. The display generator includes an image selector for selecting images from the image database, and an image arranger for determining display characteristics of selected images. The system further includes a user interface operatively coupled to the display generator for inputting operational instructions, and a display operatively coupled to the display generator for displaying montage images.

The present invention is also directed toward a method for assisting in the generation of graphic montage images, comprising the following steps:
(a) selecting a plurality of selected images from an image database;
(b) determining modifying characteristics for each of the selected images; and
(c) displaying the selected images as modified by the modifying characteristics, thereby displaying a graphics montage image.

BRIEF DESCRIPTION OF THE DRAWINGS

The present invention will now be described, by way of example only, with reference to the following drawings, in which like reference numerals refer to like parts and in which.

DETAILED DESCRIPTION OF THE PREFERRED EMBODIMENT

Figure 1A:
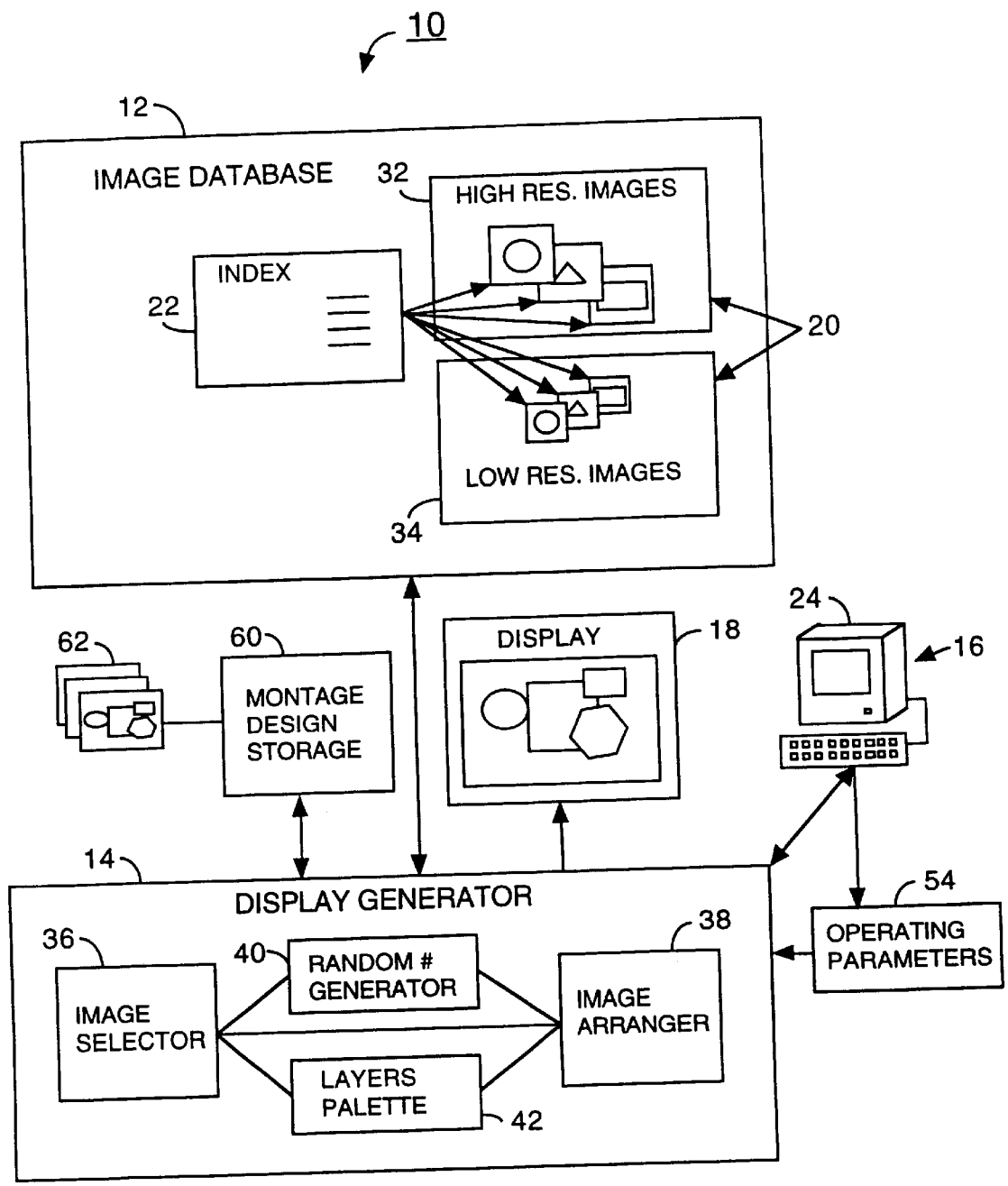
FIG. 1A is a schematic diagram of the components of the subject invention.
Figure 1B:
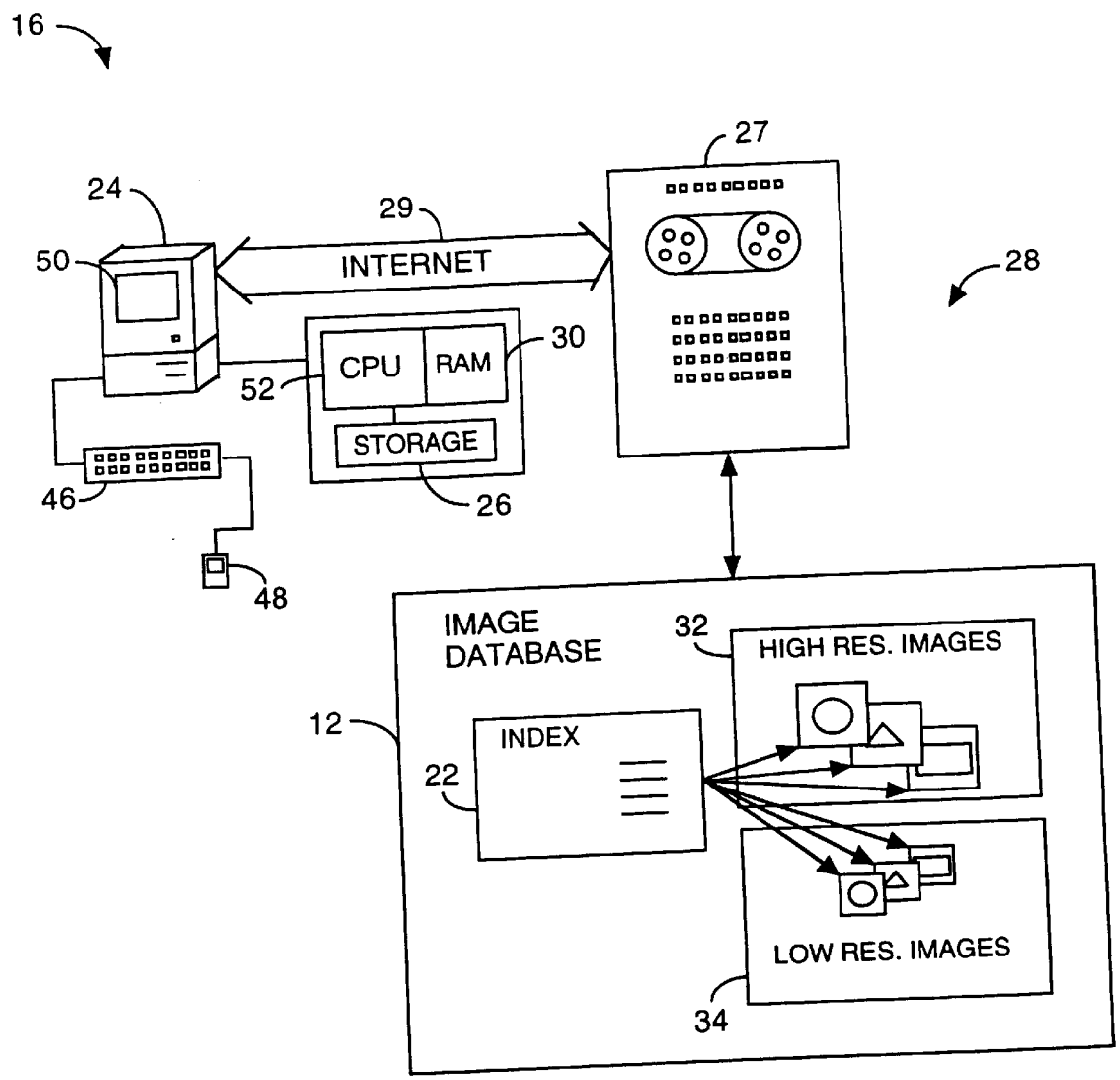
FIG. 1B is a schematic diagram of typical hardware components of the subject invention.

Referring simultaneously to FIGS. 1A and 1B, illustrated therein is a graphics montage generating system shown generally as 10 made in accordance with a preferred embodiment of the subject invention. Graphics montage generating system 10 comprises an image database 12, display generator 14, user interface 16, and a display 18. For ease of reference, as will be understood by one skilled in the art, the term "image" herein will frequently be intended to mean the corresponding image data. When reference is made to "selecting an image" or similar such phrases, in general, it should be understood that the system 10 is selecting the index corresponding to the image data for that image.

Image database 12 stores image data records 20 containing graphical data correlated to stored images, preferably including image format data. Preferably, the image database 12 includes an index 22 which contains indexes to the various image data records 20 stored in the image database 12. The indexes to the various image data records 20 are preferably organized and correlated to certain topical keywords so that images dealing with similar subject matter are correlated through the use of a common keyword. As a result, the image data records 20 can be accessed by keyword category.

Typically, the stored images are digitized photographic images which may be of an endless variety of subject matter. Although for the purposes of the present system 10 they need not be, typically, the images are stored in 70 mm rectangular format which can be oriented horizontally (landscape view) or vertically (portrait view). Images are also commonly stored having square dimensions. However, in certain instances, the subject matter of an image has been "clipped" as will be understood by one skilled in the art, such that when the image is displayed, only the selected subject matter of the photographic image is shown—the background portion of the image which would have appeared in the original photographic image has been removed or "clipped". Preferably, clipped images will be categorized together and separate from unclipped images. Additionally, the images may include previously stored text, and computer-generated images such as logos and trademarks, which have also been stored as image files.

The image data contained in the image data records 20 may be obtained or generated by the user, and then entered into the image database 12, commonly stored in the user's computer's 24 long term storage memory 26. Alternatively, some or all of the image data records 20 may be stored on a remote computer 27 in a remote image library 28, which may be accessed by the user's computer 24 through the use of a modem, the Internet 29, or other electronic communications system. Typically, even if all of the data records 20 are stored remotely in an image library 28, the index 22 will remain stored in the user's computer 24 (in RAM 30 or long term storage memory 26), although keyword data will likely need to be obtained from the image library 28.

Preferably, the image data records 20 contain corresponding high resolution data records 32 and low resolution or thumbnail data records 34 (which take up significantly less storage space than the high resolution data records 32) for each image. Providing for corresponding data records 32, 34, allows the system 10 to manipulate the low resolution data records 34 which take up less of the computer's 24 operating memory (RAM) 30, and allows the system 10 to operate faster than if it were required to manipulate the high resolution data records 32. Once a suitable montage design is generated, the high resolution data records 32 corresponding to the selected images in the design may be substituted for the low resolution data records 34 to obtain a high resolution montage design typically for high quality printing purposes, for integration into a color transparency, for incorporation into a multimedia or video application, or for display on a high resolution display monitor.

Display generator 14 is electronically coupled to the image database 12 in order to be capable of retrieving (through the use of the index 22) the image data stored in the image data records 20. Preferably, the display generator 14 comprises an image selector module 36, an arrangement module 38, a random number generator 40, and a layers palette 42. As will be discussed in greater detail below, the image selector module 36 selects images from the image database 12, which are stored in the layers palette 42 and then arranged into a graphics montage design by the arrangement module 38. Both modules 36, 38 are responsive to operating instructions or parameters received from the user via the user interface 16. Additionally, as will be discussed in greater detail below, the image selector module 36 and the arrangement module 38 at times may utilize the random number generator 40 in randomizing some of the steps undertaken by these modules 36, 38.

The user interface 16 typically comprises a standard computer keyboard 46, mouse 48, monitor 50 and a suitably programmed CPU 52. Typically some or all of the system 10 will be programmed and stored in the RAM 30 of the computer's 24 CPU 52. Preferably, the interface 16 utilizes user-friendly point-and-click interface software. The interface 16 will preferably permit the user to select and view any of the images stored in the image database 12, which are organized by keyword category. As will be discussed in greater detail below, the user will typically be permitted to input some or all of the parameters 54 which control the selection and arrangement process that the display generator 14 follows during operation of the system 10. These parameters 54 also include the selection, positioning and other arrangement rules that the system 10 follows, as will be discussed in greater detail below. The term "user operating instructions" as used herein is intended to include these parameters 54 that the user is able to input.

Typically, the computer monitor 50 will also be the system's 10 display 18. However, in certain situations it may be useful for the display 18 to be separate from the computer monitor 50, such as when a high speed, high resolution imaging display monitor is used for larger, more detailed graphics applications.

The system 10 also preferably includes a montage design storage 60 operatively coupled to the image database 12, the display generator 14, the user interface 16 and to the display 18, which stores data correlated to previously generated montage designs 62. In most instances, it will not be necessary for the montage design storage 60 to store more than a limited number, such as ten, of previously generated montages 62. As new montage designs are generated by the system 10, the data correlated to these new designs is substituted for the oldest stored montage design data. Preferably, too, rather than storing complete image data correlated to the montage designs 62, to save on memory storage requirements, the montage data for each such design preferably only includes the indexes for the various images in the design, as well as data correlated to the positioning and other qualities and characteristics applied to the subsisting images, so that the composite montage designs 62 may be regenerated by the system 10.

Figure 2A:
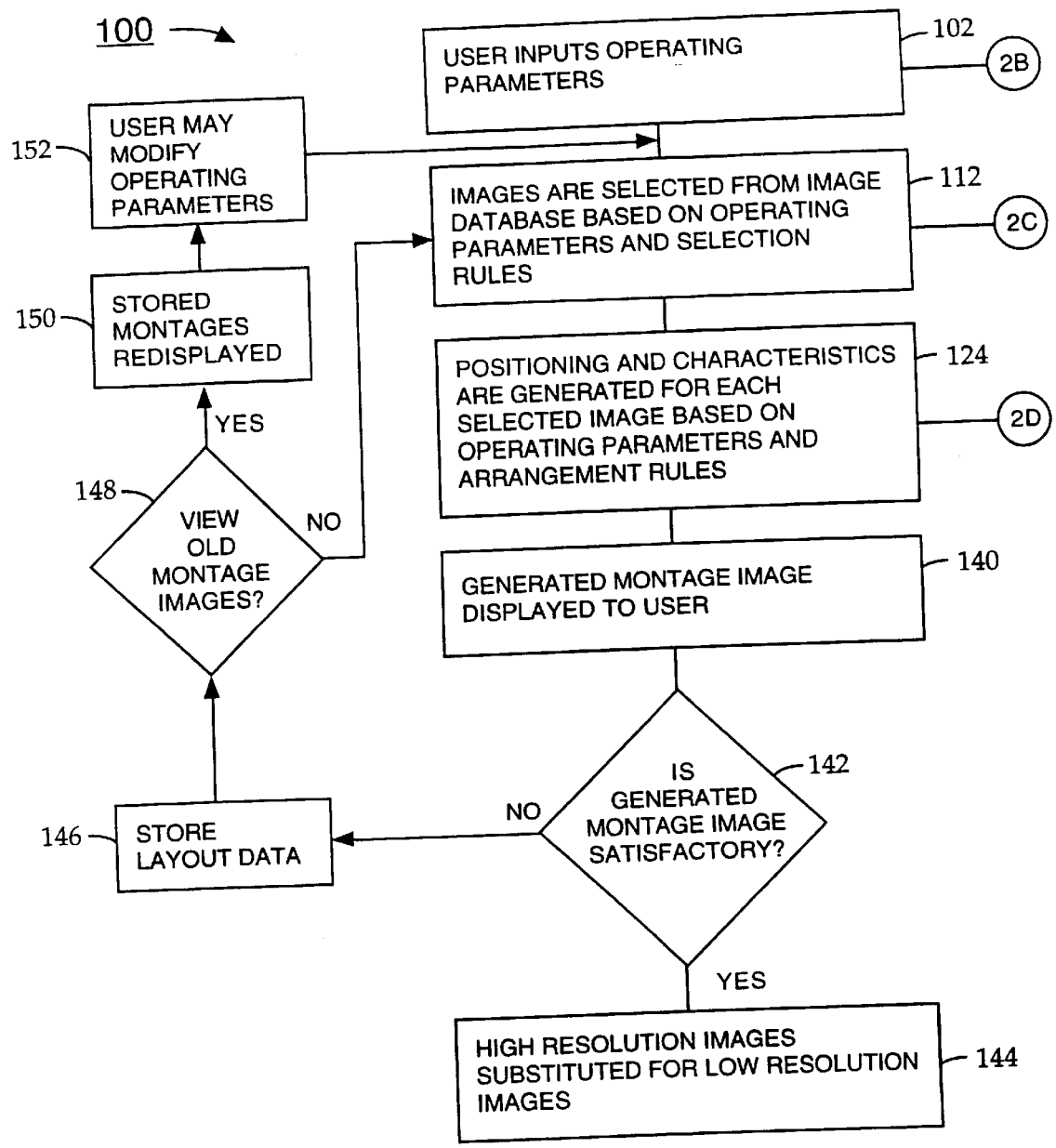
FIGS. 2A–2D together comprise a flow chart showing the method used by the subject invention to generate montage designs.
Figure 2B:
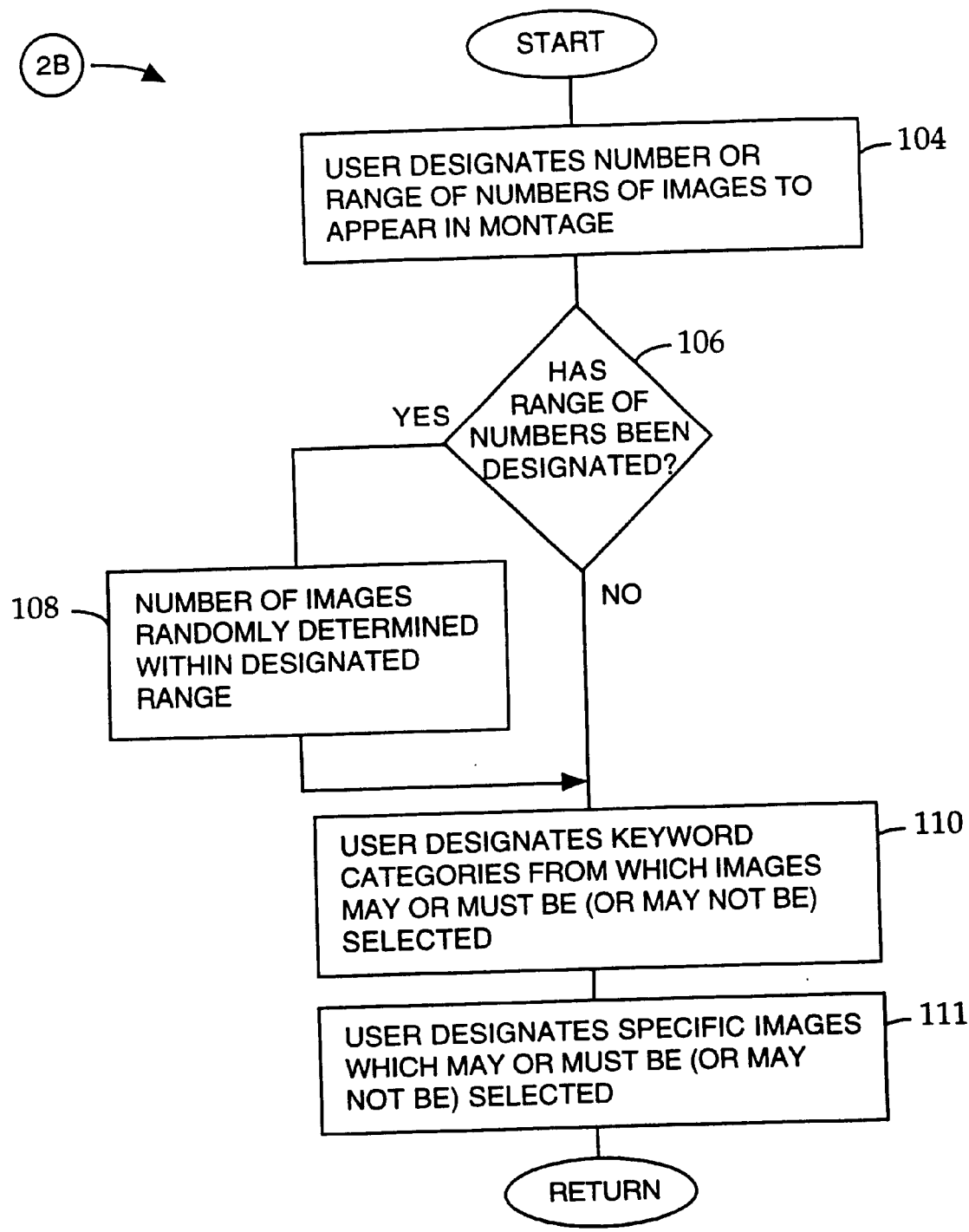

FIGS. 2A to 2D illustrate the steps of the method 100 carried out by the system 10 made in accordance with the subject invention. A montage designer initially inputs the system's 10 operating parameters 54 through the user interface 16 (Block 102). As indicated by the circle marked "2B" on FIG. 2A, FIG. 2B illustrates the steps involved in Block 102. One of the initial operating parameters 54 that the user is able to designate is the number of images that are to appear in the montage (Block 104). If the user fails to specify the number of images, a default value, such as four images, will typically be designated to appear in the montage. Preferably, the user will also be permitted to provide a range of numbers, within which the display generator 14 will randomly choose the number of images. If such a range has been entered (as determined in Block 106), the display generator's 14 random number generator 40 randomly selects a number within the inputted range (Block 108). Once the number of images to appear in the montage has been determined (either by the user or by the system 10), and hence the size of the layers palette 42 has been established, the user is then permitted to designate keyword categories from the index 22 from which images may be selected, and correspondingly, which categories images may not be selected from (Block 110). Preferably, the user will also be able to specify categories from which one or more images must be selected by the image selector 36. The user will also preferably be able to designate specific images from the image database 12, which must appear (or alternatively must not appear) in the generated montage (Block 111). Any images which the user has designated must appear in the montage are added to the layers palette 42. Typically, a more skilled montage designer will want to exert greater control over the system's 10 operation by inputting specific operational parameters 54.

Figure 2C:
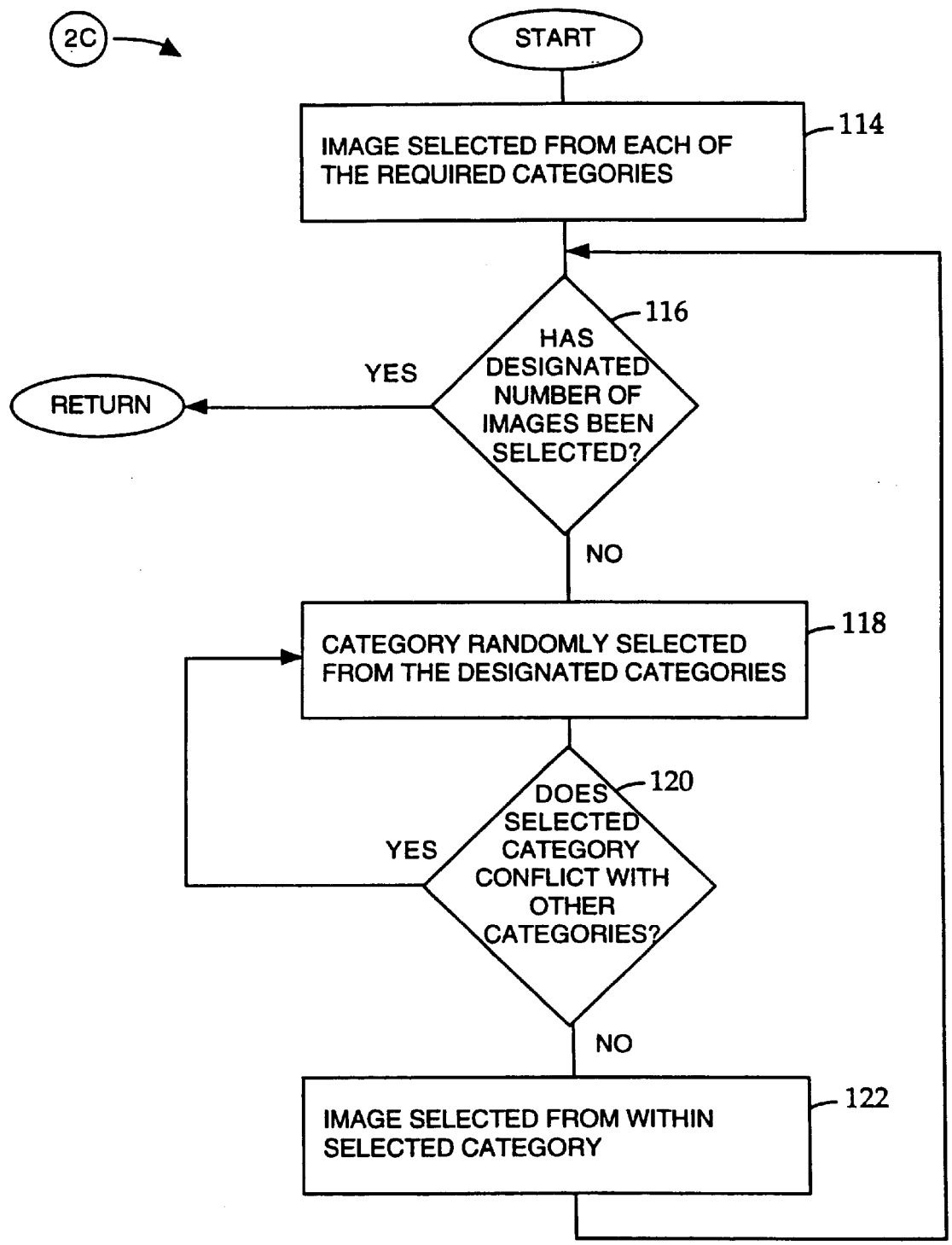

Referring back to FIG. 2A, once the user has input the operating parameters 54, the image selector 36 selects the appropriate number of images from the image database 12 based on the operating parameters 54 input by the user (in accordance with Block 102) as well as the programmed selection rules (Block 112). As indicated by the circle marked "2C" on FIG. 2A, FIG. 2C illustrates the steps involved in Block 112. For each of the categories from which the user has designated an image must be selected, the image selector 36 selects an image from each such designated category, which are added to the list of images stored in the layers palette 42, if any, the user has designated must appear in the montage (Block 114). Typically, when an image is selected from a designated category, it will be randomly chosen, utilizing the random number generator 40, and added to the layers palette 42. Alternatively, however, this selection may be conducted in a sequential manner such that the image selector 36 selects different images during the operation of the system 10. The image selector 36 then confirms whether the layers palette 42 has its full quota of images, or if more images need to be selected (Block 116). If more images need to be selected, the image selector 36 selects a category from which the next image will be chosen, from the categories which the user has designated may be used in Block 110 (Block 118). Typically this selection process will be conducted randomly. Preferably, the image selector 36 has been programmed with certain combination rules. Typically, these rules will specify that certain categories of images should not be used in the same montage, which have generally been developed through experience. Preferably the user may modify (and hence override) these rules when inputting the operating parameters 54 (discussed in relation to Block 102) if he or she chooses. In accordance with the combination rules, the image selector 36 determines if the selected category "conflicts" with any of the categories of the images stored in the layers palette 42 (Block 120). If it does conflict, then another category is selected. If the selected category is acceptable, the image selector selects one of the images from within the selected category (typically randomly), which is then added to the layers palette 42 (Block 122). Blocks 116 through 122 are then repeated until the layers palette 42 has the requisite number of images stored in it.

Figure 2D:
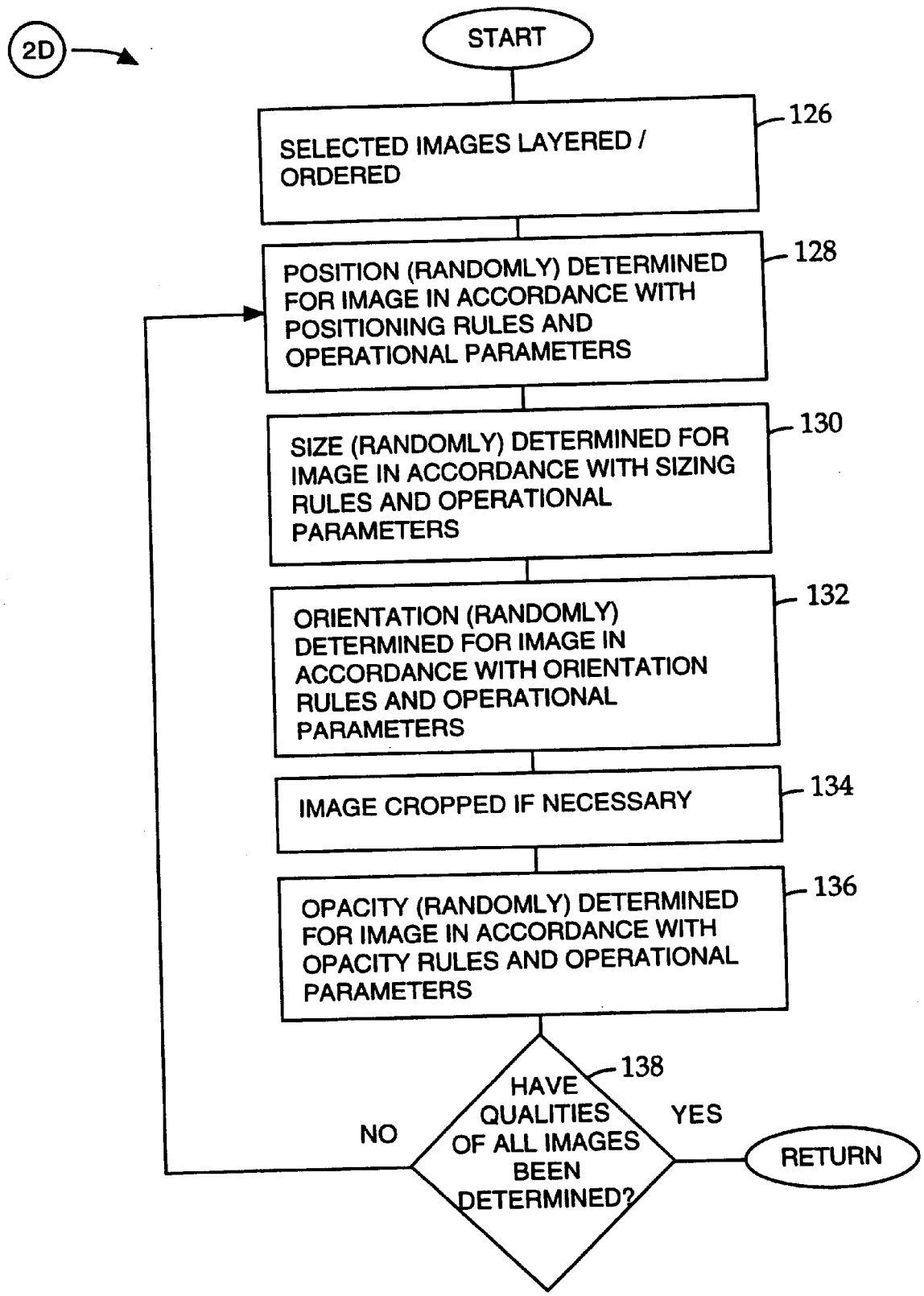

Referring again to FIG. 2A, once the selection process has been finalized and the layers palette 42 has stored the required number of images to be used in the montage, the image arranger 38 then generates a position within the montage, as well as qualities or characteristics that each image will possess, according to the operating parameters 54 and the arrangement rules (Block 124). As indicated by the circle marked "2D" on FIG. 2A, FIG. 2D illustrates the steps involved in Block 124.

Within the layers palette 42, the selected images are randomly layered or ordered (Block 126). As will be understood by one skilled in the art, one of the purposes of ordering the images is to determine whether one image may be considered to be "behind" another image, and hence potentially obscured by that image.

Figure 3A:
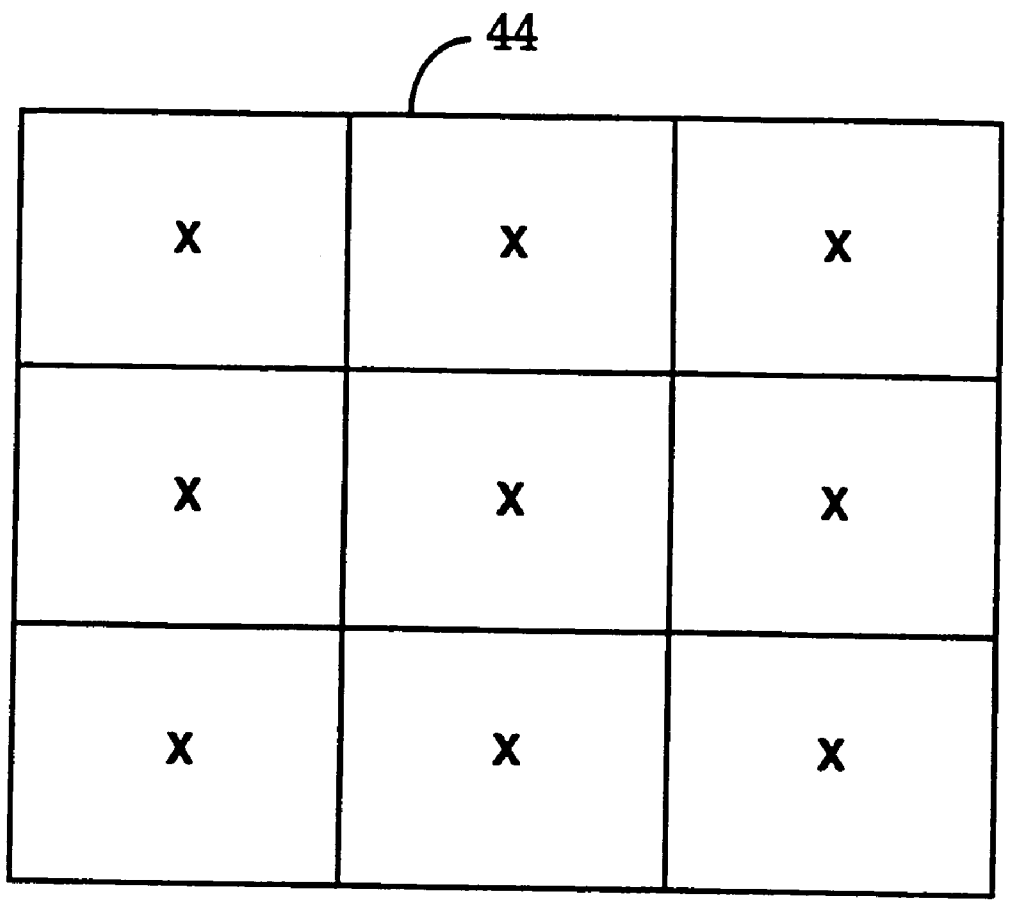
FIG. 3A is an overhead view of a placement grid correlated to an output display, with a first set of indicated image placement positions.
Figure 3B:
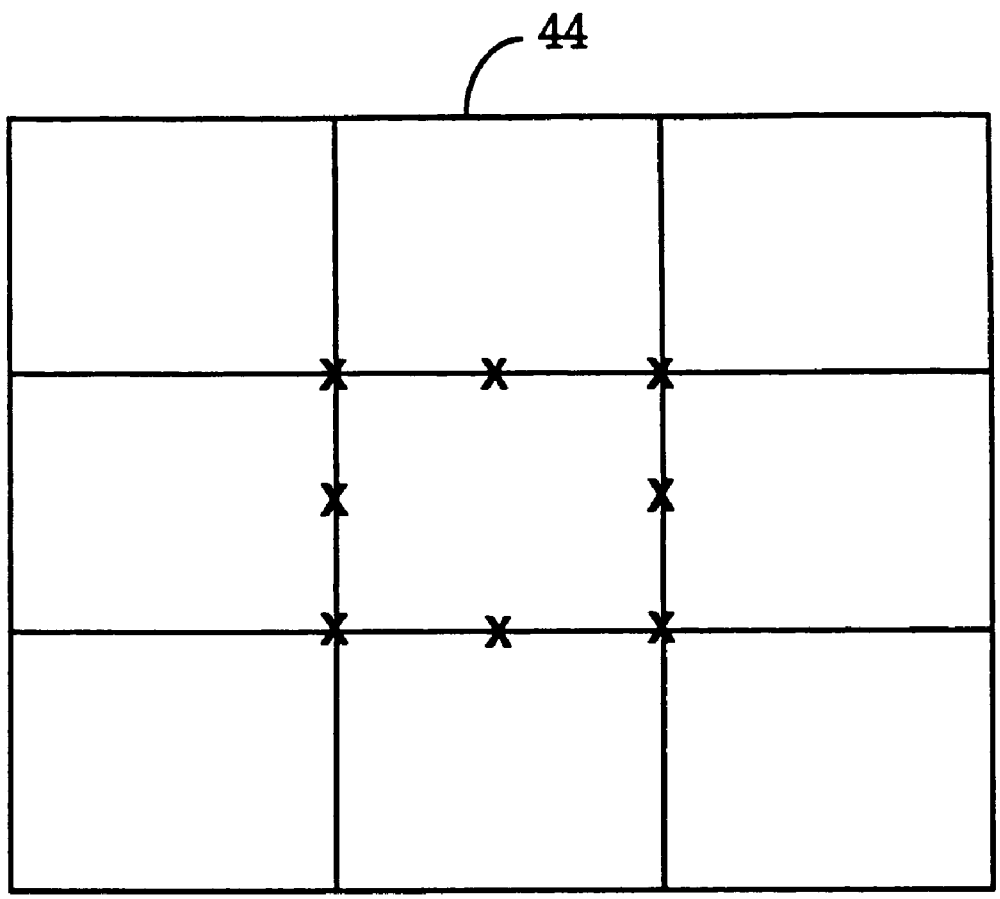
FIG. 3B is an overhead view of the placement grid of FIG. 3A, with a second set of indicated image placement positions.

Starting with the first image in the layers palette 42, the image arranger 38 randomly determines a position (by selecting an insertion point) for each selected image in the montage, unless the user has already designated its position in connection with Block 102 (Block 128). Referring now to FIG. 3A, illustrated therein is a grid 44, which is correlated to the montage to be produced. The grid 44 has been marked into nine equally sized rectangular sections, the center point of each of which has been marked with an 'X'. In FIG. 3B, the corners of the central rectangular section as well as the midpoints of each of its sides have been marked with an 'X'. The points marked 'X' in both of FIGS. 4A and 4B, totalling seventeen in number, have been found to be effective insertion points for images to appear in montages. In addition, positive results have been produced when the probability of selecting the insertion points X of FIG. 3B and the centremost insertion point of FIG. 3A are weighted more heavily than for the remaining insertion points, when the insertion point for an image is randomly determined in accordance with Block 128. Additionally, the selected insertion point may be offset in a randomly selected direction and in a relatively short, randomly selected distance, in order to minimize the possible perception that the generated montage design has regular image placements (which is typically not considered a good result in montage design). Once an insertion point for an image is determined, the position of the full image is determined by mapping the center-point of the image (which is easily determined for rectangular images) to the selected insertion point. The center-point of clipped images may similarly be determined, but preferably an optical center-point based on an aesthetic valuation has been preselected and stored with the image data for each such clipped image, which is used for correlating the position of the clipped image with the selected insertion point.

Next, for each image in the layers palette 42, a randomly selected factor, such as ⅛, ¼, ½, 1, 2X, 3X or 4X is determined by which the image is to be scaled when the montage image is generated, unless the user has inputted a specific scaling size to be utilized during the operating parameters 54 step of Block 102 (Block 130). As will be understood by one skilled in the art, through known means image data stored in the image data records 20 is scalable through the use of scaling factors to enable the size of the produced image to be adjustable. As a result, different images which have been scaled by the same scaling factor will typically be of approximately the same size. It has also been found that positive results may be achieved if the scaling factors are not weighted evenly, such that the likelihood of a particular scaling factor being randomly selected should be greatest around the scaling factor of 1 and decrease towards the smallest and largest scaling factors. Preferably, too, the probability weighting of the scaling factors is varied according to the determined position of a particular image, as determined during Block 128. When an insertion point is selected which is near the sides of the grid 44, such as the insertion points X illustrated in FIG. 3A (excluding the centremost X), smaller scaling factors will preferably be weighted more heavily to reduce the possibility that a significant portion of the image will be cropped at the edge of the montage (as discussed in relation to block 134, below).

Next, the image arranger 38 randomly selects a rotation factor (unless the user has already specified this when inputting the operational parameters 54 in connection with Block 102) (Block 132). Typically, the orientation rules will prevent the image from being rotated past 90° in any direction.

Once the size, position and orientation of an image have been determined, through known means, the image arranger 38 is able to determine to what extent the selected image must be cropped to be displayed in the montage design (Block 134). In other words, the image arranger 38 must determine to what extent parts of an image (if any) will fall outside of the montage design as a result of the image's size, positioning and orientation.

Figure 4A:
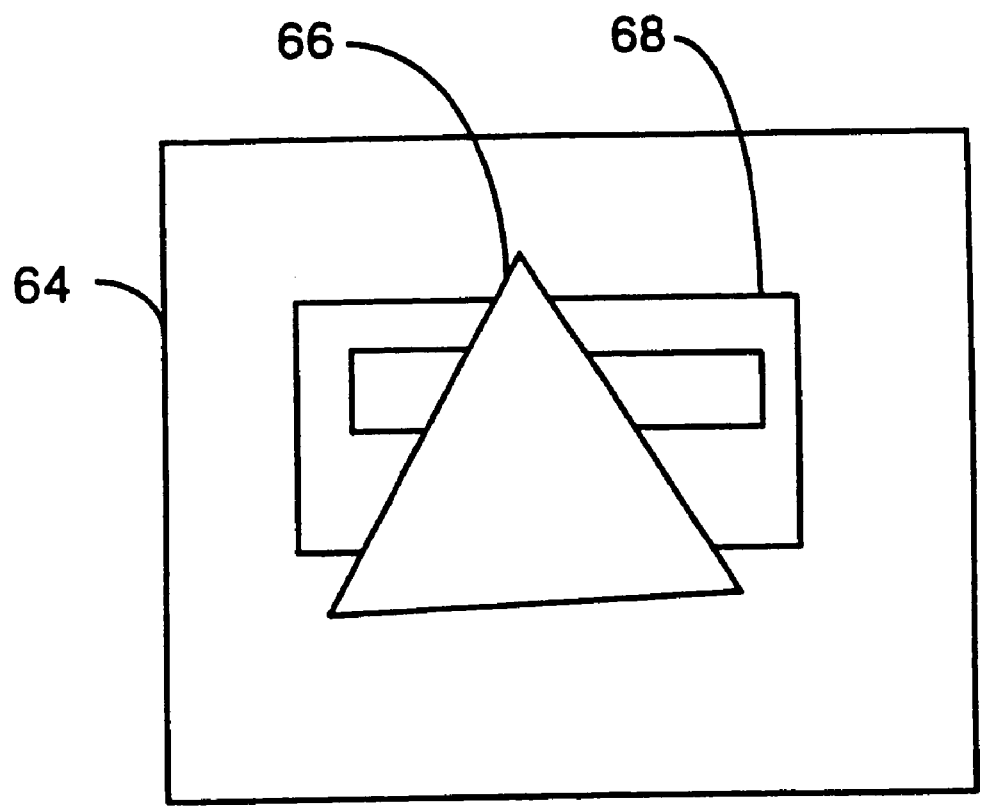
FIG. 4A is an overhead view of one uppermost image overlapping another, in which the opacity of the uppermost image is 100%.
Figure 4B:
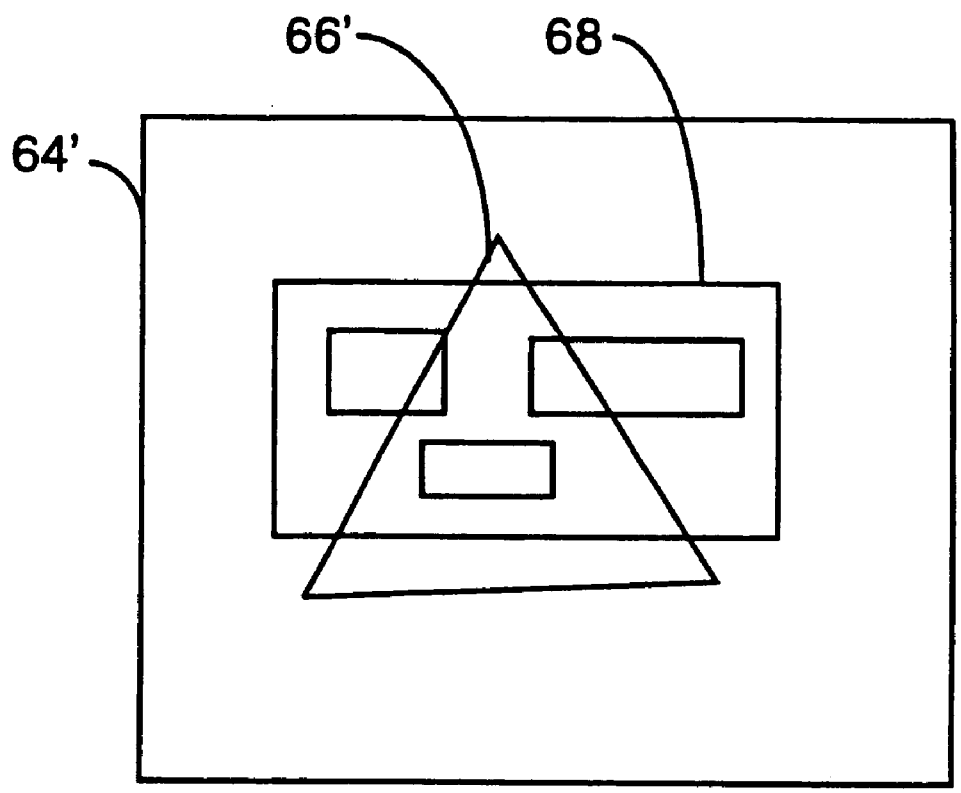
FIG. 4B is an overhead view of the images of FIG. 4A, in which the opacity of the uppermost image is less than 100%.

Finally, unless the user has otherwise specified the opacity level of the image when inputting the operational parameters 54 in connection with Block 102, the image arranger 38 randomly selects an opacity level for the image (Block 136). FIGS. 5A and 5B illustrate the effect of varying the opacity level for an image. As can be seen in FIG. 4A, in a montage design 64, a first image 66 (which has an opacity level of 100%) is positioned 'in front of' a second image 68, with the result that all of the first image 66 is visible, while the portion of the second image 68 'behind' the first image 66 is hidden. In FIG. 4B, the same two images of FIG. 4A are present in a montage design 64'. However, in FIG. 4B, the opacity level of the first image (now referred to as 66') has been changed to 50%. As a result, portions of the second image 68 are somewhat visible through the first image 66', thereby creating an interesting blending or distortion effect. Since an opacity level of 0% would render a particular image completely invisible, in most instances the programmed opacity rules should prevent a 0% opacity level (and very near to the 0% level) from being randomly selected.

Finally, the image arranger 38 determines if the qualities or characteristics for all of the images in the layers palette 42 have been determined (Block 138). If not, the steps in Blocks 128 to 138 are repeated until the qualities and characteristics of all of the selected images have been designated.

Referring back to FIG. 2A, once the images and their various qualities and characteristics are determined, the montage containing each of the various images in its designated position and format is generated and displayed to the user on the display 18 (Block 140). The generated montage is typically displayed for a limited period of time, such as two seconds. The display period should be selected to allow the user sufficient time to view the generated montage and decide if he or she likes the montage or even certain aspects of it. Preferably, unless the user inputs a command to the system 10 via the user interface 16 that the user has some interest in the displayed montage design (such as by double-clicking the mouse 48), it will be determined that the generated montage design is not satisfactory (Block 142). If the user does indicate to the system 10 that the displayed montage design is satisfactory, through the use of the index 22 through known means the corresponding high resolution images stored in the high resolution data records 32 will be substituted for the low resolution images, with the respective qualities and characteristics being applied to the high resolution images (Block 144).

If the generated montage design is not considered suitable, the montage data for that montage design is stored in the montage design storage 60 (Block 146). If the user determines to view old montage designs 62, which the user may indicate to the system 10 by inputting a command through the user interface 16, such as 'hitting' the "Esc" key on a standard keyboard 46 or making the appropriate selection using the mouse 48 (Block 148), recently created montage designs 62 can be regenerated from the stored montage data and displayed for the user (Block 150). This enables the user to call up recently displayed montage designs 62 if the user has inadvertently allowed an interesting montage to pass.

Once the user has viewed as many of the stored montages 62 from the montage design storage 60 as he or she wishes, the user is then given the opportunity to modify the operating parameters 54. The user can retain some or all aspects of a previously generated montage 62, such as some or all of the selected images, some or all of the modifying characteristics of the images, some or all of the categories, or reconfigure the operating parameters 54 directly, in a manner similar to the steps discussed in connection with Block 102 (Block 152). At this stage, the layers palette 42 is cleared of data except to the extent that certain specific images (and any qualities or characteristics) are retained by the user. The system 10 then begins the process of selecting new images, as discussed in connection with Block 112.

Figure 5:
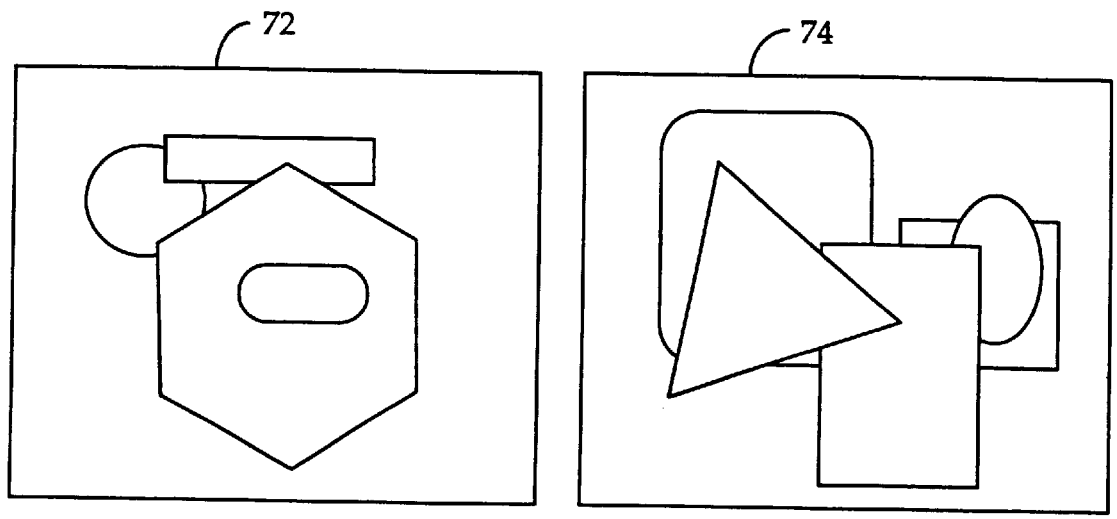
FIG. 5 is an overhead view one possible example of a series of two representations of graphics montage designs generated in accordance with the subject invention.

In use, from the user's perspective, the system 10 will steadily generate random or seemingly random montage designs containing images selected from the image database 12 based on the input and/or default operating parameters 54. FIG. 5 illustrates a series 70 of two generated montage designs 72, 74. Although only two generated montage designs 72, 74 have been illustrated, in use, typically numerous montage designs will be displayed in rapid series to the user, before the user selects a montage image as being useful. This stream of montage images may provide the montage designer with a source of inspiration for generating an acceptable montage. Alternatively, the system 10 may generate a montage design which is completely satisfactory to the user, or which merely requires some final adjustments from the user. Periodically, the user may choose to review previously generated montages 62, the underlying data for which has been stored by the system 10. It has been found that use of the system 10 typically results in improved efficiency in generating montage designs. Using the system 10, montage designers are able to save time in generating workable montage designs.

Figure 6:
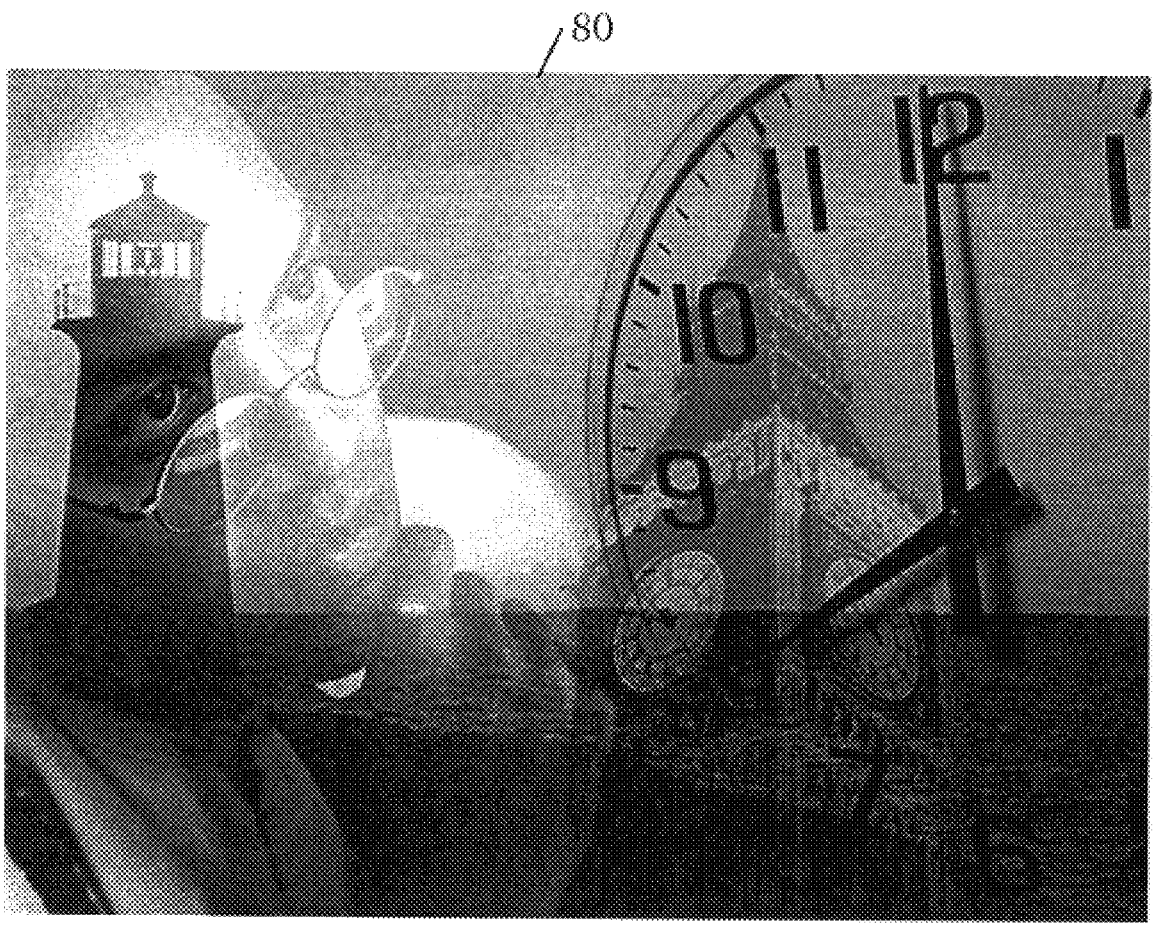
FIG. 6 is an overhead view of a montage design generated in accordance with the subject invention.

FIG. 6 illustrates a montage design 80, generated in accordance with the subject invention.

The subject invention has been illustrated and described as involving numerous random or apparently random determinations in the process of generating montage designs for display. It has been found that displaying randomly or seemingly randomly generated images most closely simulates, and most effectively stimulates the creative process. Alternatively, however, the images and their modifying qualities and characteristics could be determined in a systematic, non-random fashion. Depending on the manner in which such systematic determinations are made, sequentially generated montage designs may appear quite random from each other, or may appear to be generated in a systematic fashion. It is preferable that in generating the series of montages, no pattern is discernable to the montage designer using the system 10.

Thus, while what is shown and described herein constitutes preferred embodiments of the subject invention, it should be understood that various changes can be made without departing from the subject invention, the scope of which is defined in the appended claims.

What is claimed is:

1. A system for generating a montage image, the system comprising:

(a) an image database having a plurality of image data files containing data correlated to stored images;

(b) a display generator operatively coupled to the image database and responsive to operational parameters for generating montage images;

(c) wherein the display generator includes an image selector for selecting one or more of said stored images from the image database;

(d) and wherein the display generator further includes an image modifier for determining modifying characteristics for each of the selected images;

(e) and wherein the modifying characteristics of a selected image include the relative orientation of the selected image in the montage image;

(f) a randomizer operatively coupled to the image modifier for seemingly randomizing the determination of the modifying characteristics for at least one of the selected images;

(g) a user interface operatively coupled to the display generator for inputting operational parameters; and (h) a display device operatively coupled to the display generator for displaying the selected images as modified by the modifying characteristics in a montage image.

2. The system as defined in claim 1, wherein the randomizer is also operatively coupled to the image selector to seemingly randomize the selection of at least one of the selected images from the image database.

3. The system as defined in claim 1, wherein the modifying characteristics of a selected image include the relative position of the selected image in the montage image.

4. The system as defined in claim 1, wherein the modifying characteristics of a selected image include the relative size of the selected image in the montage image.

5. The system as defined in claim 1, wherein the modifying characteristics of a selected image include the opacity level of the selected image in the montage image.

6. The system described in claim 1, further comprising a montage design database capable of storing a plurality of montage image data files containing data correlated to the displayed montage image.

7. A system for generating a montage image, the system comprising:
(a) an image database having a plurality of image data files containing data correlated to stored images;
(b) a display generator operatively coupled to the image database and responsive to operational parameters for generating montage images;
(c) wherein the display generator includes an image selector for selecting one or more of said stored images from the image database;
(d) and wherein the display generator further includes an image modifier for determining modifying characteristics for each of the selected images;
(e) a randomizer operatively coupled to the image modifier for seemingly randomizing the determination of the modifying characteristics for at least one of the selected images;
(f) a user interface operatively coupled to the display generator for inputting operational parameters;
(g) a display device operatively coupled to the display generator for displaying the selected images as modified by the modifying characteristics in a montage image; and
(h) a repeater responsive to the operational parameters for causing the system to continuously generate and display a series of montage images on the display device.

8. The system as defined in claim in claim 7, wherein the randomizer is also operatively coupled to the image selector to seemingly randomize the selection of at least one of the selected images from the image database.

9. The system as defined in claim 7, wherein the modifying characteristics of a selected image include the relative position of the selected image in the montage image.

10. The system as defined in claim 7, wherein the modifying characteristics of a selected image include the relative size of the selected image in the montage image.

11. The system as defined in claim 7, wherein the modifying characteristics of a selected image include the opacity level of the selected image in the montage image.

12. The system described in claim 7, further comprising a montage design database capable of storing a plurality of montage image data files containing data correlated to the displayed montage image.

13. The system as defined in claim 7, wherein the modifying characteristics of a selected image include the relative orientation of the selected image in the montage image.

* * * * *